US007021379B2

(12) United States Patent
Nguyen

(10) Patent No.: US 7,021,379 B2
(45) Date of Patent: *Apr. 4, 2006

(54) METHODS AND COMPOSITIONS FOR ENHANCING CONSOLIDATION STRENGTH OF PROPPANT IN SUBTERRANEAN FRACTURES

(75) Inventor: Philip D. Nguyen, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 272 days.

This patent is subject to a terminal disclaimer.

(21) Appl. No.: 10/614,627

(22) Filed: Jul. 7, 2003

(65) Prior Publication Data
US 2005/0006093 A1    Jan. 13, 2005

(51) Int. Cl.
*E21B 43/267* (2006.01)
*E21B 33/138* (2006.01)

(52) U.S. Cl. ............... 166/280.2; 166/281; 166/300; 428/405; 428/407; 507/201; 507/219; 507/220; 507/234; 507/267; 507/269; 507/273; 507/277; 507/921; 507/924; 523/131

(58) Field of Classification Search ............... 166/276, 166/280.2, 281, 288, 295, 300, 308.3; 428/404, 428/405, 407; 507/201, 219, 220, 221, 234, 507/267, 269, 273, 277, 921, 924; 523/131
See application file for complete search history.

(56) References Cited

U.S. PATENT DOCUMENTS

| 2,238,671 | A | 4/1941 | Woodhouse | 166/21 |
|---|---|---|---|---|
| 2,703,316 | A | 3/1955 | Schneider | 260/78.3 |
| 2,869,642 | A | 1/1959 | McKay et al. | |
| 3,047,067 | A | 7/1962 | Williams et al. | 166/33 |
| 3,123,138 | A | 3/1964 | Robichaux | |
| 3,176,768 | A | 4/1965 | Brandt et al. | 166/33 |
| 3,199,590 | A | 8/1965 | Young | |
| 3,272,650 | A | 9/1966 | MacVittie | 134/7 |
| 3,297,086 | A | 1/1967 | Spain | |
| 3,308,885 | A | 3/1967 | Sandiford | |
| 3,316,965 | A | 5/1967 | Watanabe | 166/33 |
| 3,375,872 | A | 4/1968 | McLaughlin et al. | 166/29 |
| 3,404,735 | A | 10/1968 | Young et al. | 166/33 |
| 3,415,320 | A | 12/1968 | Young | 166/33 |
| 3,492,147 | A | 1/1970 | Young et al. | 117/62.2 |
| 3,659,651 | A | 5/1972 | Graham | 166/280 |
| 3,681,287 | A | 8/1972 | Brown et al. | 260/67 |
| 3,754,598 | A | 8/1973 | Holloway, Jr. | 166/249 |
| 3,765,804 | A | 10/1973 | Brandon | 417/540 |
| 3,768,564 | A | 10/1973 | Knox et al. | 166/307 |
| 3,784,585 | A | 1/1974 | Schmitt et al. | 260/861 |
| 3,819,525 | A | 6/1974 | Hattenbrun | 252/132 |
| 3,828,854 | A | 8/1974 | Templeton et al. | 166/307 |
| 3,842,911 | A | 10/1974 | Know et al. | 166/307 |
| 3,857,444 | A | 12/1974 | Copeland | 166/276 |
| 3,863,709 | A | 2/1975 | Fitch | 165/1 |
| 3,868,998 | A | 3/1975 | Lybarger et al. | 166/278 |
| 3,888,311 | A | 6/1975 | Cooke, Jr. | 166/280 |
| 3,912,692 | A | 10/1975 | Casey et al. | 260/78.3 |
| 3,948,672 | A | 4/1976 | Harnberger | 106/90 |
| 3,955,993 | A | 5/1976 | Curtice | 106/90 |
| 3,960,736 | A | 6/1976 | Free et al. | 252/8.55 R |
| 4,008,763 | A | 2/1977 | Lowe et al. | 166/253 |
| 4,029,148 | A | 6/1977 | Emery | 166/250.1 |
| 4,031,958 | A | 6/1977 | Sandiford et al. | 166/270 |
| 4,042,032 | A | 8/1977 | Anderson et al. | 166/276 |
| 4,070,865 | A | 1/1978 | McLaughlin | 61/36 |
| 4,074,760 | A | 2/1978 | Copeland et al. | 166/276 |
| 4,169,798 | A | 10/1979 | DeMartino | 252/8.55 R |
| 4,172,066 | A | 10/1979 | Zweigle et al. | 260/29.6 TA |
| 4,245,702 | A | 1/1981 | Haafkens et al. | 166/307 |
| 4,273,187 | A | 6/1981 | Satter et al. | 166/250 |
| 4,291,766 | A | 9/1981 | Davies et al. | 166/276 |
| 4,305,463 | A | 12/1981 | Zakiewicz | 106/245 |
| 4,336,842 | A | 6/1982 | Graham et al. | 166/276 |
| 4,352,674 | A | 10/1982 | Fery | 23/230 |
| 4,353,806 | A | 10/1982 | Canter et al. | 507/229 |
| 4,387,769 | A | 6/1983 | Erbstoesser et al. | 166/295 |
| 4,415,805 | A | 11/1983 | Fertl et al. | 250/260 |
| 4,439,489 | A | 3/1984 | Johnson et al. | 428/404 |
| 4,443,347 | A | 4/1984 | Underdown et al. | 252/8.55 R |
| 4,460,052 | A | 7/1984 | Gockel | 175/72 |
| 4,470,915 | A | 9/1984 | Conway | 252/8.55 R |
| 4,493,875 | A | 1/1985 | Beck et al. | 428/403 |
| 4,494,605 | A | 1/1985 | Wiechel et al. | 166/288 |
| 4,498,995 | A | 2/1985 | Gockel | 252/8.5 LC |
| 4,501,328 | A | 2/1985 | Nichols | 166/288 |
| 4,526,695 | A | 7/1985 | Erbstosser et al. | 252/8.55 R |
| 4,527,627 | A | 7/1985 | Graham et al. | 166/280 |
| 4,541,489 | A | 9/1985 | Wu | 166/312 |
| 4,546,012 | A | 10/1985 | Brooks | 427/213 |
| 4,553,596 | A | 11/1985 | Graham et al. | 166/295 |
| 4,564,459 | A | 1/1986 | Underdown et al. | 252/8.55 R |

(Continued)

FOREIGN PATENT DOCUMENTS

CA    2063877    5/2003

(Continued)

OTHER PUBLICATIONS

Foreign Search Report and Opinion (PCT Appl. No. GB2004/002674), Dec. 16, 2004.

(Continued)

*Primary Examiner*—George Suchfield
(74) *Attorney, Agent, or Firm*—Robert A. Kent; Baker Botts

(57) ABSTRACT

Improved methods and compositions for consolidating proppant in fractures formed in subterranean zones are provided. An improvement of this invention comprises using proppant particles having a coating of hardenable resin including a gel breaker. The gel breaker facilitates removal of gelled carrier fluid from the surface of the proppant particles.

22 Claims, No Drawings

U.S. PATENT DOCUMENTS

| | | | | |
|---|---|---|---|---|
| 4,572,803 A | 2/1986 | Yamazoe et al. ............... 534/16 |
| 4,649,998 A | 3/1987 | Friedman .................... 166/294 |
| 4,664,819 A | 5/1987 | Glaze et al. ............. 252/8.551 |
| 4,665,988 A | 5/1987 | Murphey et al. ........... 166/295 |
| 4,669,543 A | 6/1987 | Young ........................ 166/276 |
| 4,675,140 A | 6/1987 | Sparks et al. ................ 264/4.3 |
| 4,683,954 A | 8/1987 | Walker et al. .............. 166/307 |
| 4,694,905 A | 9/1987 | Armbruster ................ 166/280 |
| 4,715,967 A | 12/1987 | Bellis ...................... 252/8.551 |
| 4,716,964 A | 1/1988 | Erbstoesser et al. ........ 166/284 |
| 4,733,729 A | 3/1988 | Copeland .................... 166/276 |
| 4,739,832 A | 4/1988 | Jennings, Jr. et al. ....... 166/299 |
| 4,785,884 A | 11/1988 | Armbruster ................ 166/280 |
| 4,787,453 A | 11/1988 | Hewgill et al. .......... 166/272.3 |
| 4,789,105 A | 12/1988 | Hosokawa et al. ........... 241/67 |
| 4,796,701 A | 1/1989 | Hudson et al. ............. 166/278 |
| 4,797,262 A | 1/1989 | Dewitz ....................... 422/142 |
| 4,800,960 A | 1/1989 | Friedman et al. .......... 166/276 |
| 4,809,783 A | 3/1989 | Hollenbeck et al. ........ 166/307 |
| 4,817,721 A | 4/1989 | Pober ........................ 166/295 |
| 4,829,100 A | 5/1989 | Murphey et al. ........... 523/131 |
| 4,838,352 A | 6/1989 | Oberste-Padtberg et al. ........................ 166/291 |
| 4,842,072 A | 6/1989 | Friedman et al. ........... 166/295 |
| 4,843,118 A | 6/1989 | Lai et al. .................... 524/555 |
| 4,848,467 A | 7/1989 | Cantu et al. ................ 166/281 |
| 4,848,470 A | 7/1989 | Korpics ...................... 166/312 |
| 4,850,430 A | 7/1989 | Copeland et al. ........... 166/276 |
| 4,886,354 A | 12/1989 | Welch et al. .................. 356/70 |
| 4,888,240 A | 12/1989 | Graham et al. ............. 428/403 |
| 4,895,207 A | 1/1990 | Friedman et al. ........... 166/276 |
| 4,903,770 A | 2/1990 | Friedman et al. ........... 166/288 |
| 4,934,456 A | 6/1990 | Moradi-Araghi ............ 166/270 |
| 4,936,385 A | 6/1990 | Weaver et al. .............. 166/288 |
| 4,942,186 A | 7/1990 | Murphey et al. ........... 523/131 |
| 4,957,165 A | 9/1990 | Cantu et al. ................ 166/276 |
| 4,959,432 A | 9/1990 | Fan et al. .................... 526/287 |
| 4,961,466 A | 10/1990 | Himes et al. ................ 166/250 |
| 4,969,522 A | 11/1990 | Whitehurst et al. ......... 166/278 |
| 4,969,523 A | 11/1990 | Martin et al. ................ 166/278 |
| 4,986,353 A | 1/1991 | Clark et al. .................. 166/279 |
| 4,986,354 A | 1/1991 | Cantu et al. ................ 166/279 |
| 4,986,355 A | 1/1991 | Casad et al. ................ 166/295 |
| 5,030,603 A | 7/1991 | Rumpf et al. ............... 501/127 |
| 5,049,743 A | 9/1991 | Taylor, III et al. .......... 250/303 |
| 5,082,056 A | 1/1992 | Tackett, Jr. ................. 166/295 |
| 5,107,928 A | 4/1992 | Hilterhaus .................. 166/293 |
| 5,128,390 A | 7/1992 | Murphey et al. ........... 523/130 |
| 5,135,051 A | 8/1992 | Fracteau et al. ............. 166/104 |
| 5,142,023 A | 8/1992 | Gruber et al. ............... 528/354 |
| 5,165,438 A | 11/1992 | Fracteau et al. ................ 137/1 |
| 5,173,527 A | 12/1992 | Calve ........................... 524/74 |
| 5,182,051 A | 1/1993 | Bandy et al. ................ 252/645 |
| 5,199,491 A | 4/1993 | Kutts et al. .................. 166/276 |
| 5,199,492 A | 4/1993 | Surles et al. ................ 166/295 |
| 5,211,234 A | 5/1993 | Floyd ......................... 166/276 |
| 5,216,050 A | 6/1993 | Sinclair ....................... 524/108 |
| 5,218,038 A * | 6/1993 | Johnson et al. ............. 524/541 |
| 5,232,955 A | 8/1993 | Caabai et al. ................ 521/63 |
| 5,232,961 A | 8/1993 | Murphey et al. ........... 523/414 |
| 5,238,068 A | 8/1993 | Fredickson ................. 166/307 |
| 5,247,059 A | 9/1993 | Gruber et al. ............... 528/354 |
| 5,249,628 A | 10/1993 | Surjaatmadja .............. 166/305 |
| 5,253,711 A * | 10/1993 | Mondshine ................. 166/300 |
| 5,256,729 A | 10/1993 | Kutts et al. .................. 524/700 |
| 5,273,115 A | 12/1993 | Spafford ..................... 166/281 |
| 5,285,849 A | 2/1994 | Surles et al. ................ 166/295 |
| 5,293,939 A | 3/1994 | Surles et al. ................ 166/295 |
| 5,295,542 A | 3/1994 | Cole et al. ................... 166/278 |
| 5,320,171 A | 6/1994 | Laramay ..................... 166/285 |
| 5,321,062 A | 6/1994 | Landrum et al. ............ 523/141 |
| 5,325,923 A | 7/1994 | Surjaatmadja et al. ....... 166/308 |
| 5,330,005 A | 7/1994 | Card et al. ................... 166/280 |
| 5,332,037 A | 7/1994 | Schmidt et al. ............. 166/276 |
| 5,335,726 A | 8/1994 | Rodrogues .................. 166/295 |
| 5,351,754 A | 10/1994 | Hardin et al. ............... 166/249 |
| 5,358,051 A | 10/1994 | Rodrigues ................... 166/295 |
| 5,359,026 A | 10/1994 | Gruber ........................ 528/354 |
| 5,360,068 A | 11/1994 | Sprunt et al. ................ 166/259 |
| 5,361,856 A | 11/1994 | Surjaatmajda et al. ......... 175/67 |
| 5,363,916 A | 11/1994 | Himes et al. ................ 166/276 |
| 5,373,901 A | 12/1994 | Norman et al. ............. 166/300 |
| 5,381,864 A | 1/1995 | Nguyen et al. .............. 166/280 |
| 5,386,874 A | 2/1995 | Laramay et al. ............. 166/300 |
| 5,388,648 A | 2/1995 | Jordan, Jr. ................... 166/380 |
| 5,393,810 A * | 2/1995 | Harris et al. .................. 524/56 |
| 5,396,957 A | 3/1995 | Surjaatmadja et al. ....... 166/308 |
| 5,402,846 A | 4/1995 | Jennings, Jr. et al. ........ 166/259 |
| 5,422,183 A | 6/1995 | Sinclair et al. .............. 428/403 |
| 5,423,381 A | 6/1995 | Surles et al. ................ 166/295 |
| 5,439,055 A | 8/1995 | Card et al. ................... 166/280 |
| 5,460,226 A | 10/1995 | Lawton et al. ............... 166/300 |
| 5,464,060 A | 11/1995 | Hale et al. ................... 166/293 |
| 5,475,080 A | 12/1995 | Gruber et al. ............... 528/354 |
| 5,484,881 A | 1/1996 | Gruber et al. ................. 528/54 |
| 5,492,178 A | 2/1996 | Nguyen et al. .............. 166/276 |
| 5,494,103 A | 2/1996 | Surjaatmadja et al. ....... 166/222 |
| 5,497,830 A | 3/1996 | Boles et al. ................. 166/300 |
| 5,498,280 A | 3/1996 | Fistner et al. ................. 106/19 |
| 5,499,678 A | 3/1996 | Surjaatmadja et al. ....... 166/298 |
| 5,501,275 A | 3/1996 | Card et al. ................... 166/280 |
| 5,505,787 A | 4/1996 | Yamaguchi ..................... 134/4 |
| 5,512,071 A | 4/1996 | Yam et al. ..................... 51/307 |
| 5,520,250 A * | 5/1996 | Harry et al. ................. 166/278 |
| 5,522,460 A | 6/1996 | Shu ............................. 166/295 |
| 5,529,123 A | 6/1996 | Carpenter et al. ........... 166/293 |
| 5,531,274 A | 7/1996 | Bienvenu, Jr. .............. 166/280 |
| 5,536,807 A | 7/1996 | Gruber et al. ............... 528/354 |
| 5,545,824 A | 8/1996 | Stengel et al. ............... 524/590 |
| 5,547,023 A | 8/1996 | McDaniel et al. ........... 166/280 |
| 5,551,513 A | 9/1996 | Suries et al. ................ 166/278 |
| 5,551,514 A | 9/1996 | Nelson et al. ............... 166/280 |
| 5,582,249 A | 12/1996 | Caveny et al. .............. 166/276 |
| 5,582,250 A | 12/1996 | Constein .................... 166/280 |
| 5,588,488 A | 12/1996 | Vijn et al. ................... 166/293 |
| 5,591,700 A | 1/1997 | Harris et al. ................ 507/204 |
| 5,594,095 A | 1/1997 | Gruber et al. ............... 528/354 |
| 5,595,245 A | 1/1997 | Scott, III .................. 166/250.1 |
| 5,597,784 A | 1/1997 | Sinclair et al. .............. 507/219 |
| 5,604,184 A | 2/1997 | Ellis et al. ................... 507/117 |
| 5,604,186 A | 2/1997 | Hunt et al. .................. 507/204 |
| 5,609,207 A * | 3/1997 | Dewprashad et al. ........ 166/276 |
| 5,620,049 A | 4/1997 | Gipson et al. ............... 166/248 |
| 5,639,806 A | 6/1997 | Johnson et al. .............. 523/208 |
| 5,670,473 A | 9/1997 | Scepanski ................... 510/445 |
| 5,697,440 A | 12/1997 | Weaver et al. .............. 166/281 |
| 5,698,322 A | 12/1997 | Tsai et al. .................... 428/373 |
| 5,712,314 A | 1/1998 | Surles et al. ................ 521/41 |
| 5,732,364 A | 3/1998 | Kalb et al. ...................... 588/8 |
| 5,765,642 A | 6/1998 | Surjaatmadja .............. 166/297 |
| 5,775,425 A | 7/1998 | Weaver et al. .............. 166/276 |
| 5,782,300 A | 7/1998 | James et al. ................ 166/278 |
| 5,783,822 A | 7/1998 | Buchanan et al. .......... 250/259 |
| 5,787,986 A | 8/1998 | Weaver et al. .............. 166/280 |
| 5,791,415 A | 8/1998 | Nguyen et al. .............. 166/280 |
| 5,799,734 A | 9/1998 | Norman et al. ............. 166/278 |
| 5,806,593 A | 9/1998 | Suries ......................... 166/270 |
| 5,830,987 A | 11/1998 | Smith ......................... 528/332 |

| | | | | | | | |
|---|---|---|---|---|---|---|---|
| 5,833,000 | A | 11/1998 | Weaver et al. ............... 166/276 | 6,192,986 | B1 | 2/2001 | Urlwin-Smith ............. 166/295 |
| 5,833,361 | A | 11/1998 | Funk ........................... 366/80 | 6,196,317 | B1 | 3/2001 | Hardy ......................... 166/295 |
| 5,836,391 | A | 11/1998 | Jonasson et al. ............ 166/295 | 6,202,751 | B1 | 3/2001 | Chatterji et al. ............. 166/276 |
| 5,836,392 | A | 11/1998 | Urlwin-Smith ............. 166/295 | 6,209,643 | B1 | 4/2001 | Nguyen et al. .............. 166/276 |
| 5,837,656 | A | 11/1998 | Sinclair et al. .............. 507/220 | 6,209,644 | B1 | 4/2001 | Brunet ......................... 166/297 |
| 5,837,785 | A | 11/1998 | Kinsho et al. ............... 525/527 | 6,209,646 | B1 | 4/2001 | Reddy et al. ................ 166/300 |
| 5,839,510 | A | 11/1998 | Weaver et al. ............... 166/276 | 6,210,471 | B1 | 4/2001 | Craig ....................... 106/31.08 |
| 5,849,401 | A | 12/1998 | El-Afandi et al. ........... 428/215 | 6,214,773 | B1 | 4/2001 | Harris et al. ................. 507/271 |
| 5,849,590 | A | 12/1998 | Anderson, II et al. ........ 436/27 | 6,231,664 | B1 | 5/2001 | Chatterji et al. ............. 106/724 |
| 5,853,048 | A | 12/1998 | Weaver et al. ............... 166/279 | 6,234,251 | B1 | 5/2001 | Chatterji et al. ............. 166/295 |
| 5,864,003 | A | 1/1999 | Qureshi et al. .............. 528/141 | 6,238,597 | B1 | 5/2001 | Yim et al. .................... 252/512 |
| 5,865,936 | A | 2/1999 | Edelman et al. ............. 156/310 | 6,241,019 | B1 | 6/2001 | Davidson et al. ............ 166/249 |
| 5,871,049 | A | 2/1999 | Weaver et al. ............... 166/276 | 6,242,390 | B1 | 6/2001 | Mitchell et al. .............. 507/211 |
| 5,873,413 | A | 2/1999 | Chatterji et al. ............. 166/293 | 6,244,344 | B1 | 6/2001 | Chatterji et al. ............. 166/295 |
| 5,875,844 | A | 3/1999 | Chatterji et al. ............. 166/293 | 6,257,335 | B1 | 7/2001 | Nguyen et al. .............. 166/280 |
| 5,875,845 | A | 3/1999 | Chatterji et al. ............. 166/293 | 6,260,622 | B1 | 7/2001 | Blok et al. ................. 166/305.1 |
| 5,875,846 | A | 3/1999 | Chatterji et al. ............. 166/293 | 6,271,181 | B1 | 8/2001 | Chatterji et al. ............. 507/219 |
| 5,893,383 | A | 4/1999 | Fracteau ........................ 137/14 | 6,274,650 | B1 | 8/2001 | Cui ............................... 523/457 |
| 5,893,416 | A | 4/1999 | Read ............................ 166/304 | 6,279,652 | B1 | 8/2001 | Chatterji et al. ............. 166/194 |
| 5,908,073 | A | 6/1999 | Nguyen et al. .............. 166/276 | 6,279,656 | B1 | 8/2001 | Sinclair et al. .............. 166/310 |
| 5,911,282 | A | 6/1999 | Onan et al. ..................... 175/72 | 6,283,214 | B1 | 9/2001 | Guinot et al. ................ 166/297 |
| 5,916,933 | A | 6/1999 | Johnson et al. .............. 523/208 | 6,302,207 | B1 | 10/2001 | Nguyen et al. .............. 166/276 |
| 5,921,317 | A | 7/1999 | Dewprashad et al. ........ 166/208 | 6,306,998 | B1 | 10/2001 | Kimura et al. ................. 528/12 |
| 5,924,488 | A | 7/1999 | Nguyen et al. .............. 166/280 | 6,311,773 | B1 | 11/2001 | Todd et al. ................... 166/280 |
| 5,929,437 | A | 7/1999 | Elliott et al. ................. 250/259 | 6,321,841 | B1 | 11/2001 | Eoff et al. .................... 166/291 |
| 5,944,105 | A | 8/1999 | Nguyen ........................ 166/278 | 6,323,307 | B1 | 11/2001 | Bigg et al. ................... 528/354 |
| 5,945,387 | A | 8/1999 | Chatterji et al. ............. 507/224 | 6,326,458 | B1 | 12/2001 | Gruber et al. ............... 528/354 |
| 5,948,734 | A | * 9/1999 | Sinclair et al. .............. 507/219 | 6,328,105 | B1 | 12/2001 | Betzold ........................ 166/280 |
| 5,957,204 | A | 9/1999 | Chatterji et al. ............. 166/295 | 6,328,106 | B1 | 12/2001 | Griffith et al. ............... 166/295 |
| 5,960,880 | A | 10/1999 | Nguyen et al. .............. 166/276 | 6,330,916 | B1 | 12/2001 | Rickards et al. ............. 166/280 |
| 5,964,291 | A | 10/1999 | Bourne et al. ............... 166/279 | 6,330,917 | B1 | 12/2001 | Chatterji et al. ............. 166/295 |
| 5,969,006 | A | 10/1999 | Onan et al. ................... 523/166 | 6,350,309 | B1 | 2/2002 | Chatterji et al. ............. 106/677 |
| 5,977,283 | A | 11/1999 | Rossitto ......................... 528/44 | 6,357,527 | B1 | 3/2002 | Norman et al. .............. 166/300 |
| 5,994,785 | A | 11/1999 | Higuchi et al. .............. 527/789 | 6,364,018 | B1 | 4/2002 | Brannon et al. .......... 166/280.2 |
| RE36,466 | E | 12/1999 | Nelson et al. ............... 166/280 | 6,364,945 | B1 | 4/2002 | Chatterji et al. ............. 106/677 |
| 6,003,600 | A | 12/1999 | Nguyen et al. .............. 166/281 | 6,367,165 | B1 | 4/2002 | Huttlin ........................... 34/582 |
| 6,004,400 | A | 12/1999 | Bishop et al. .................... 134/2 | 6,367,549 | B1 | 4/2002 | Chatterji et al. ............. 166/292 |
| 6,006,835 | A | 12/1999 | Onan et al. ................... 166/295 | 6,372,678 | B1 | 4/2002 | Youngsman et al. ........ 504/128 |
| 6,006,836 | A | 12/1999 | Chatterji et al. ............. 166/295 | 6,376,571 | B1 | 4/2002 | Chawla et al. ................. 522/64 |
| 6,012,524 | A | 1/2000 | Chatterji et al. ............. 166/295 | 6,387,986 | B1 | 5/2002 | Moradi-Araghi et al. ... 523/211 |
| 6,016,870 | A | 1/2000 | Dewprashad et al. ........ 166/295 | 6,390,195 | B1 | 5/2002 | Nguyen et al. .............. 166/276 |
| 6,024,170 | A | 2/2000 | McCabe et al. .............. 166/300 | 6,401,817 | B1 | 6/2002 | Griffith et al. ............... 166/295 |
| 6,028,113 | A | 2/2000 | Scepanski .................... 514/643 | 6,405,797 | B1 | 6/2002 | Davidson et al. ............ 166/249 |
| 6,028,534 | A | 2/2000 | Ciglenec et al. .......... 340/856.2 | 6,406,789 | B1 | 6/2002 | McDaniel et al. ........... 428/403 |
| 6,040,398 | A | 3/2000 | Kinsho et al. ............... 525/527 | 6,408,943 | B1 | 6/2002 | Schultz et al. ............... 166/285 |
| 6,047,772 | A | 4/2000 | Weaver et al. ............... 166/276 | 6,422,314 | B1 | 7/2002 | Todd et al. ................... 166/312 |
| 6,059,034 | A | 5/2000 | Rickards et al. ............. 166/280 | 6,439,309 | B1 | 8/2002 | Matherly et al. ............. 166/276 |
| 6,059,035 | A | 5/2000 | Chatterji et al. ............. 166/293 | 6,439,310 | B1 | 8/2002 | Scott, III et al. ............. 166/308 |
| 6,059,036 | A | 5/2000 | Chatterji et al. ............. 166/294 | 6,440,255 | B1 | 8/2002 | Kohlhammer et al. ....... 156/283 |
| 6,068,055 | A | 5/2000 | Chatterji et al. ............. 166/293 | 6,446,727 | B1 | 9/2002 | Zemlak et al. ............... 166/308 |
| 6,069,117 | A | 5/2000 | Onan et al. ................... 507/202 | 6,448,206 | B1 | 9/2002 | Griffith et al. ............... 507/219 |
| 6,074,739 | A | 6/2000 | Katagiri ........................ 428/323 | 6,450,260 | B1 | 9/2002 | James et al. .................. 166/277 |
| 6,079,492 | A | 6/2000 | Hoogteijling et al. ........ 166/276 | 6,454,003 | B1 | 9/2002 | Chang et al. ................. 166/270 |
| 6,098,711 | A | 8/2000 | Chatterji et al. ............. 166/294 | 6,458,885 | B1 | 10/2002 | Stengal et al. ............... 524/507 |
| 6,114,410 | A | 9/2000 | Betzold ........................ 523/130 | 6,485,947 | B1 | 11/2002 | Rajgarhia et al. ............ 435/139 |
| 6,123,871 | A | 9/2000 | Carroll ................... 252/301.36 | 6,488,091 | B1 | 12/2002 | Weaver et al. ............... 166/300 |
| 6,123,965 | A | 9/2000 | Jacon et al. .................. 424/489 | 6,488,763 | B1 | 12/2002 | Brothers et al. .............. 106/692 |
| 6,124,246 | A | 9/2000 | Heathman et al. ........... 507/219 | 6,494,263 | B1 | 12/2002 | Todd ............................ 166/312 |
| 6,130,286 | A | 10/2000 | Thomas et al. .............. 524/507 | 6,503,870 | B1 | 1/2003 | Griffith et al. ............... 507/219 |
| 6,135,987 | A | 10/2000 | Tsai et al. .................... 604/365 | 6,508,305 | B1 | 1/2003 | Brannon et al. .............. 166/293 |
| 6,140,446 | A | 10/2000 | Fujiki et al. ................... 528/15 | 6,527,051 | B1 | 3/2003 | Reddy et al. ................ 166/300 |
| 6,148,911 | A | 11/2000 | Gipson et al. ............... 166/248 | 6,528,157 | B1 | 3/2003 | Hussain et al. .............. 428/325 |
| 6,152,234 | A | 11/2000 | Newhouse et al. .......... 166/403 | 6,531,427 | B1 | 3/2003 | Shuchart et al. ............. 507/267 |
| 6,162,766 | A | 12/2000 | Muir et al. ................... 507/267 | 6,538,576 | B1 | 3/2003 | Schultz et al. ............ 340/859.6 |
| 6,169,058 | B1 | 1/2001 | Le et al. ....................... 507/222 | 6,543,545 | B1 | 4/2003 | Chatterji et al. ............. 166/381 |
| 6,172,011 | B1 | 1/2001 | Card et al. ................... 507/204 | 6,552,333 | B1 | 4/2003 | Storm et al. ............... 250/269.3 |
| 6,172,077 | B1 | 1/2001 | Curtis et al. ................. 514/278 | 6,554,071 | B1 | 4/2003 | Reddy et al. ................ 166/293 |
| 6,176,315 | B1 | 1/2001 | Reddy et al. ................ 166/295 | 6,555,507 | B1 | 4/2003 | Chatterji et al. ............. 507/219 |
| 6,177,484 | B1 | 1/2001 | Surles .......................... 523/131 | 6,569,814 | B1 | 5/2003 | Brady et al. ................. 507/201 |
| 6,184,311 | B1 | 2/2001 | O'Keefe et al. .............. 525/438 | 6,582,819 | B1 | 6/2003 | McDaniel et al. ........... 428/402 |
| 6,187,834 | B1 | 2/2001 | Thayer et al. .................. 522/15 | 6,593,402 | B1 | 7/2003 | Chatterji et al. ................. 524/7 |
| 6,189,615 | B1 | 2/2001 | Sydansk ....................... 166/270 | 6,599,863 | B1 | 7/2003 | Palmer et al. ................ 507/219 |
| 6,192,985 | B1 | 2/2001 | Hinkel et al. ................ 166/280 | 6,608,162 | B1 | 8/2003 | Chiu et al. ................... 528/129 |

| | | | |
|---|---|---|---|
| 6,616,320 B1 | 9/2003 | Huber et al. | 366/156.2 |
| 6,620,857 B1 | 9/2003 | Valet | 522/42 |
| 6,626,241 B1 | 9/2003 | Nguyen | 166/278 |
| 6,632,527 B1 | 10/2003 | McDaniel et al. | 428/402 |
| 6,632,892 B1 | 10/2003 | Rubinsztajn et al. | 525/476 |
| 6,642,309 B1 | 11/2003 | Komitsu et al. | 525/100 |
| 6,648,501 B1 | 11/2003 | Huber et al. | 366/301 |
| 6,659,179 B1 | 12/2003 | Nguyen | 166/227 |
| 6,664,343 B1 | 12/2003 | Narisawa et al. | 525/474 |
| 6,667,279 B1 | 12/2003 | Hessert et al. | 507/225 |
| 6,668,926 B1* | 12/2003 | Nguyen et al. | 166/281 |
| 6,669,771 B1 | 12/2003 | Tokiwa et al. | 106/162.7 |
| 6,681,856 B1 | 1/2004 | Chatterji et al. | 166/294 |
| 6,686,328 B1 | 2/2004 | Binder | 510/446 |
| 6,705,400 B1 | 3/2004 | Nugyen et al. | 166/281 |
| 6,710,019 B1 | 3/2004 | Sawdon et al. | 507/136 |
| 6,713,170 B1 | 3/2004 | Kaneka et al. | 428/323 |
| 6,725,926 B1 | 4/2004 | Nguyen et al. | 166/254.1 |
| 6,725,931 B1* | 4/2004 | Nguyen et al. | 166/280.2 |
| 6,729,404 B1* | 5/2004 | Nguyen et al. | 166/280.2 |
| 6,732,800 B1 | 5/2004 | Acock et al. | 166/308 |
| 6,745,159 B1 | 6/2004 | Todd et al. | 703/10 |
| 6,749,025 B1 | 6/2004 | Brannon et al. | 166/305.1 |
| 6,763,888 B1 | 7/2004 | Harris et al. | 166/305.1 |
| 6,766,858 B1 | 7/2004 | Nguyen et al. | 166/300 |
| 6,776,236 B1 | 8/2004 | Nguyen | 166/279 |
| 6,832,650 B1 | 12/2004 | Nguyen et al. | 166/279 |
| 6,851,474 B1 | 2/2005 | Nguyen | 166/279 |
| 6,887,834 B1* | 5/2005 | Nguyen et al. | 507/221 |
| 2001/0016562 A1 | 8/2001 | Muir et al. | 507/201 |
| 2002/0043370 A1 | 4/2002 | Poe | 166/250.07 |
| 2002/0070020 A1 | 6/2002 | Nguyen | 166/295 |
| 2003/0006036 A1 | 1/2003 | Malone et al. | 166/250.12 |
| 2003/0060374 A1 | 3/2003 | Cooke, Jr. | 507/200 |
| 2003/0114314 A1 | 6/2003 | Ballard et al. | 507/100 |
| 2003/0130133 A1 | 7/2003 | Vollmer | 507/100 |
| 2003/0131999 A1 | 7/2003 | Nguyen et al. | 166/280 |
| 2003/0148893 A1 | 8/2003 | Lungofer et al. | 507/200 |
| 2003/0186820 A1 | 10/2003 | Thesing | 507/200 |
| 2003/0188766 A1 | 10/2003 | Banerjee et al. | 134/7 |
| 2003/0188872 A1* | 10/2003 | Nguyen et al. | 166/308 |
| 2003/0196805 A1 | 10/2003 | Boney et al. | 166/200 |
| 2003/0205376 A1 | 11/2003 | Ayoub et al. | 166/254.2 |
| 2003/0230408 A1 | 12/2003 | Acock et al. | 166/297 |
| 2003/0234103 A1 | 12/2003 | Lee et al. | 166/293 |
| 2004/0000402 A1* | 1/2004 | Nguyen et al. | 166/280 |
| 2004/0014607 A1 | 1/2004 | Sinclair et al. | 507/200 |
| 2004/0014608 A1 | 1/2004 | Nguyen et al. | 507/200 |
| 2004/0040706 A1 | 3/2004 | Hossaini et al. | 166/278 |
| 2004/0040708 A1 | 3/2004 | Stephenson et al. | 166/280.1 |
| 2004/0040713 A1* | 3/2004 | Nguyen et al. | 166/295 |
| 2004/0048752 A1 | 3/2004 | Nguyen et al. | 507/269 |
| 2004/0055747 A1 | 3/2004 | Lee | 166/278 |
| 2004/0106525 A1 | 6/2004 | Willbert et al. | 507/200 |
| 2004/0138068 A1 | 7/2004 | Rimmer et al. | 507/100 |
| 2004/0149441 A1 | 8/2004 | Nguyen et al. | 166/280.1 |
| 2004/0152601 A1 | 8/2004 | Still et al. | 507/100 |
| 2004/0177961 A1 | 9/2004 | Nguyen et al. | 166/280.2 |
| 2004/0194961 A1 | 10/2004 | Nguyen et al. | 166/295 |
| 2004/0206499 A1 | 10/2004 | Nguyen et al. | 166/280.2 |
| 2004/0211559 A1 | 10/2004 | Nguyen et al. | 166/276 |
| 2004/0211561 A1 | 10/2004 | Nguyen et al. | 166/280.2 |
| 2004/0221992 A1 | 11/2004 | Nguyen et al. | 166/295 |
| 2004/0231845 A1 | 11/2004 | Cooke, Jr. | 166/279 |
| 2004/0231847 A1 | 11/2004 | Nguyen et al. | 166/295 |
| 2004/0256099 A1 | 12/2004 | Nguyen et al. | 166/249 |
| 2004/0261995 A1 | 12/2004 | Nguyen et al. | 166/279 |
| 2004/0261997 A1 | 12/2004 | Nguyen et al. | 166/281 |
| 2005/0006093 A1 | 1/2005 | Nguyen et al. | 166/281 |
| 2005/0006096 A1 | 1/2005 | Nguyen et al. | 166/295 |
| 2005/0045326 A1 | 3/2005 | Nguyen | 166/278 |

FOREIGN PATENT DOCUMENTS

| | | |
|---|---|---|
| EP | 0313243 B1 | 10/1988 |
| EP | 0528595 A1 | 8/1992 |
| EP | 0510762 A2 | 11/1992 |
| EP | 0643196 A2 | 6/1994 |
| EP | 0834644 A2 | 4/1998 |
| EP | 0853186 A2 | 7/1998 |
| EP | 0864726 A2 | 9/1998 |
| EP | 0879935 B1 | 11/1998 |
| EP | 0 933 498 A1 | 8/1999 |
| EP | 1001133 A1 | 5/2000 |
| EP | 1132569 A2 | 9/2001 |
| EP | 1 326 003 A1 | 7/2003 |
| EP | 1362978 A1 | 11/2003 |
| EP | 1 394 355 A1 | 3/2004 |
| EP | 1 396 606 A2 | 3/2004 |
| EP | 1 403 466 A2 | 3/2004 |
| EP | 1464789 A1 | 10/2004 |
| GB | 2382143 A | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 A1 | 11/2001 |
| WO | WO 02/12674 A1 | 2/2002 |
| WO | WO 03/027431 A1 | 4/2003 |
| WO | WO 04/037946 A1 | 5/2004 |
| WO | WO 04/038176 A1 | 5/2004 |

OTHER PUBLICATIONS

U.S. Appl. No. 10/383,154, filed Mar. 6, 2003, Nguyen et al.
U.S. Appl. No. 10/394,898, filed Mar. 21, 2003, Eoff et al.
U.S. Appl. No. 10/408,800, filed Apr. 7, 2003, Nguyen et al.
U.S. Appl. No. 10/601,407, filed Jun. 23, 2003, Byrd et al.
U.S. Appl. No. 10/603,492, filed Jun. 25, 2003, Nguyen et al.
U.S. Appl. No. 10/649,029, filed Aug. 27, 2003, Nguyen et al.
U.S. Appl. No. 10/650,063, filed Aug. 26, 2003, Nguyen.
U.S. Appl. No. 10/650,064, filed Aug. 26, 2003, Nguyen et al.
U.S. Appl. No. 10/650,065, filed Aug. 26, 2003, Nguyen.
U.S. Appl. No. 10/659,574, filed Sep. 10, 2003, Nguyen et al.
U.S. Appl. No. 10/727,365, filed Dec. 4, 2003, Reddy et al.
U.S. Appl. No. 10/751,593, filed Jan. 5, 2004, Nguyen.
U.S. Appl. No. 10/775,347, filed Feb. 10, 2004, Nguyen.
U.S. Appl. No. 10/791,944, filed Mar. 3, 2004, Nguyen.
U.S. Appl. No. 10/793,711, filed Mar. 5, 2004, Nguyen et al.
U.S. Appl. No. 10/852,811, filed May 25, 2004, Nguyen.
U.S. Appl. No. 10/853,879, filed May 26, 2004, Nguyen et al.
U.S. Appl. No. 10/860,951, filed Jun. 4, 2004, Stegent et al.
U.S. Appl. No. 10/861,829, filed Jun. 4, 2004, Stegent et al.
U.S. Appl. No. 10/862,986, filed Jun. 8, 2004, Nguyen et al.
U.S. Appl. No. 10/864,061, filed Jun. 9, 2004, Blauch et al.
U.S. Appl. No. 10/864,618, filed Jun. 9, 2004, Blauch et al.
U.S. Appl. No. 10/868,593, filed Jun. 15, 2004, Nguyen et al.
U.S. Appl. No. 10/868,608, filed Jun. 15, 2004, Nguyen et al.
U.S. Appl. No. 10/937,076, filed Sep. 9, 2004, Nguyen et al.
U.S. Appl. No. 10/944,973, filed Sep. 20, 2004, Nguyen et al.

U.S. Appl. No. 10/972,648, filed Oct. 25, 2004, Dusterhoft et al.
U.S. Appl. No. 10/977,673, filed Oct. 29, 2004, Nguyen.
U.S. Appl. No. 11/009,277, filed Dec. 8, 2004, Welton et al.
U.S. Appl. No. 11/011,394, filed Dec. 12, 2004, Nguyen et al.
U.S. Appl. No. 11/035,833, filed Jan. 14, 2005, Nguyen.
U.S. Appl. No. 11/049,252, filed Feb. 2, 2005, Van Batenburg et al.
U.S. Appl. No. 11/053,280, filed Feb. 8, 2005, Nguyen.
U.S. Appl. No. 11/056,635, filed Feb. 11, 2005, Dusterhoft et al.
Halliburton, *CoalStim$^{SM}$ Service, Helps Boost Cash Flow From CBM Assets*, Stimulation, HO3679 10/03, 2003, Halliburton Communications.
Halliburton, *Conductivity Endurance Technology For High Permeability Reservoirs, Helps Prevent Intrusion of Formation Material Into the Proppant Pack for Improved Long-term Production*, Stimulation, 2003, Halliburton Communications.
Halliburton, *Expedite® Service, A Step-Change Improvement Over Conventional Proppant Flowback Control Systems. Provides Up to Three Times the Conductivity of RCPs.*, Stimulation, HO3296 05/04, 2004, Halliburton Communications.
Halliburton Technical Flier—Multi Stage Frac Completion Methods, 2 pages.
Halliburton "*CobraFrac$^{SM}$ Service, Coiled Tubing Fracturing—Cost-Effective Method for Stimulating Untapped Reserves*", 2 pages, 2004.
Halliburton "*CobraJetFrac$^{SM}$ Service, Cost-Effective Technology That Can Help Reduce Cost per BOE Produced, Shorten Cycle time and Reduce Capex*".
Halliburton Cobra Frac Advertisement, 2001.
Halliburton "*SurgiFrac$^{SM}$ Service, a Quick and cost-Effective Method to Help Boost Production From Openhole Horizonal Completions*", 2002.
Halliburton, *SandWedge® NT Conductivity Enhancement System, Enhances Proppant Pack Conductivity and Helps Prevent Intrusion of Formation Material for Improved Long-Term Production*, Stimulation, HO2289 05/04, 2004, Halliburton Communications.
Almond et al., *Factors Affecting Proppant Flowback With Resin Coated Proppants*, SPE 30096, pp. 171-186, May 1995.
Nguyen et al., *A Novel Approach For Enhancing Proppant Consolidation: Laboratory Testing And Field Applications*, SPE Paper No. 77748, 2002.
SPE 15547, *Field Application of Lignosulfonate Gels To Reduce Channeling*, South Swan Hills Miscible Unit, Alberta, Canada, by O.R. Wagner et al., 1986.
Owens et al., *Waterflood Pressure Pulsing for Fractured Reservoirs* SPE 1123, 1966.
Felsenthal et al., *Pressure Pulsing—An Improved Method of Waterflooding Fractured Reservoirs* SPE 1788, 1957.
Raza, "*Water and Gas Cyclic Pulsing Method for Improved Oil Recovery*", SPE 3005, 1971.
Peng et al., "*Pressure Pulsing Waterflooding in Dual Porosity Naturally Fractured Reservoirs*" SPE 17587, 1988.
Dusseault et al, "*Pressure Pulse Workovers in Heavy Oil*", SPE 79033, 2002.
Yang et al., "*Experimental Study on Fracture Initiation By Pressure Pulse*", SPE 63035, 2000.

Nguyen et al., *New Guidelines For Applying Curable Resin-Coated Proppants*, SPE Paper No. 39582, 1997.
Kazakov et al., "*Optimizing and Managing Coiled Tubing Frac Strings*" SPE 60747, 2000.
Advances in Polymer Science, vol. 157, "*Degradable Aliphatic Polyesters*" edited by A.-C. Alberston, 2001.
Gorman, *Plastic Electric: Lining up the Future of Conducting Polymers* Science News, vol. 163, May 17, 2003.
Gidley et al., "*Recent Advances in Hydraulic Fracturing*," Chapter 6, pp. 109-130, 1989.
Simmons et al., "*Poly(phenyllactide): Synthesis, Characterization, and Hydrolytic Degradation, Biomacromolecules*", vol. 2, No. 2, pp. 658-663, 2001.
Yin et al., "*Preparation and Characterization of Substituted Polylactides*", Americal Chemical Society, vol. 32, No. 23, pp. 7711-7718, 1999.
Yin et al., "*Synthesis and Properties of Polymers Derived from Substituted Lactic Acids*", American Chemical Society, Ch. 12, pp. 147-159, 2001.
Cantu et al., "*Laboratory and Field Evaluation of a Combined Fluid-Loss Control Additive and Gel Breaker for Fracturing Fluids*," SPE 18211, 1990.
Love et al., "*Selectively Placing Many Fractures in Openhole Horizontal Wells Improves Production*", SPE 50422, 1998.
McDaniel et al. "*Evolving New Stimulation Process Proves Highly Effective In Level 1 Dual-Lateral Completion*" SPE 78697, 2002.
Albertsson et al., "*Aliphatic Polyesters: Synthesis, Properties and Applications*", Advances in Polymer Science, vol. 57 Degradable Aliphatic Polyesters, 2002.
Dechy-Cabaret et al., "*Controlled Ring-Operated Polymerization of Lactide and Glycolide*" American Chemical Society, Chemical Reviews, A-Z, AA-AD, 2004.
Funkhouser et al., "*Synthetic Polymer Fracturing Fluid For High-Temperature Applications*", SPE 80236, 2003.
*Chelating Agents*, Encyclopedia of Chemical Technology, vol. 5 (764-795).
Vichaibun et al., "*A New Assay for the Enzymatic Degradation of Polylactic Acid, Short Report*", ScienceAsia, vol. 29, pp. 297-300, 2003.
CDX Gas, CDX Solution, 2003, CDX, LLC, Available @ www.cdxgas.com/solution.html, printed pp 1-2.
CDX Gas, "*What is Coalbed Methane?*" CDX, LLC. Available @ www.cdxgas.com/what.html, printed p. 1.
Halliburton brochure entitled "H2Zero™ Service Introducing The Next Generation of cost-Effective Conformance Control Solutions", 2002.
Halliburton brochure entitled INJECTROL® A Component:, 1999.
Halliburton brochure entitled "INJECTROL® G Sealant", 1999.
Halliburton brochure entitled "INJECTROL® IT Sealant", 1999.
Halliburton brochure entitled "INJECTROL® Service Treatment", 1999.
Halliburton brochure entitled "INJECTROL® U Sealant", 1999.
Halliburton brochure entitled "Sanfix® A Resin", 1999.
Halliburton brochure entitled "Pillar Frac Stimulation Technique" Fracturing Services Technical Data Sheet, 2 pages.

\* cited by examiner

METHODS AND COMPOSITIONS FOR ENHANCING CONSOLIDATION STRENGTH OF PROPPANT IN SUBTERRANEAN FRACTURES

FIELD OF THE INVENTION

The present invention relates to methods of forming one or more fractures in a subterranean zone with little or no closure pressure and consolidating proppant particles therein.

BACKGROUND OF THE INVENTION

Hydrocarbon producing wells are often stimulated by hydraulic fracturing treatments. In hydraulic fracturing, a viscous gelled fracturing fluid which also functions as a carrier fluid is pumped into a subterranean zone to be fractured at a rate and pressure such that one or more fractures are formed in the zone. Proppant particles, e.g., graded sand, for propping the fractures open are suspended in the fracturing fluid. After forming the fracture(s), a viscosity breaker is used to cause the fracturing fluid to revert to a thin fluid, i.e., "break" the viscosity, after which the fracturing fluid can be returned to the surface. Once the viscosity of the fracturing fluid is broken, the proppant particles are deposited in the fractures and function to prevent the fractures from closing so that conductive channels are formed through which fluids can readily flow.

In order to prevent the subsequent flow-back of the proppant particles as well as loose or incompetent fines with fluids produced from the subterranean zone, the proppant particles have heretofore been coated with a hardenable resin composition which is caused to harden and consolidate the proppant particles in the zone. As a general rule, consolidation requires that closure stress must be applied to the proppant grains to insure resin coated particle-to-particle contact. However, many hydraulic fractures do not completely close during the first 24 hours after fracturing treatments, especially in low-permeability formations. This results in poor consolidation. Poor consolidation allows proppant particles and formation fines to flow-back with produced formation fluids. The flow-back of the proppant particles and formation fines is very detrimental in that it erodes metal goods, plugs piping and vessels and causes damage to valves, instruments and other production equipment.

The resin coating of a pre-coated resin particle is already partially cured (hardened) to provide for storage and handling, so only a portion of the resin is available for hardening in the subterranean zone and thereby contributing to the ultimate consolidation strength. As the resin coated proppant is deposited in the fracture(s) and exposed to higher formation temperatures, the resin curing process is re-initiated. The more the resin coating cures or hardens before the resin coated proppant particles are brought into contact with each other, the lower the consolidation strength that will be developed.

Difficulty in achieving this contact is due in part to the gelled carrier fluid that forms a film of gelled carrier fluid on the surface of the resin coated proppant particles. This film significantly hinders contact between the resin coated proppant particles, and thus reduces the consolidation strength that can develop.

Thus, there are needs for improved methods of consolidating proppant particles in subterranean fractures whereby permeable packs of consolidated proppant particles are formed.

SUMMARY OF THE INVENTION

The present invention provides improved methods and compositions for consolidating proppant in fractures formed in subterranean zones which meet the needs described above and overcome the deficiencies of the prior art. The methods, pre-coated proppant particles, and coating compositions of this invention include a gel breaker that facilitates removal of gelled carrier fluid from the surface of hardenable resin coated proppant particles and allows resin coated particle-to-particle contact, thus improving the consolidation strength.

An improved method of this invention for forming one or more fractures in a subterranean zone penetrated by a well bore and consolidating proppant particles therein comprises the following steps. Proppant particles pre-coated with a hardenable resin coating composition are provided. The coating composition comprises a hardenable organic resin, a silane coupling agent and a gel breaker. A gelled liquid fracturing fluid is also prepared or provided and is pumped into the subterranean zone to form one or more fractures therein. The pre-coated proppant particles are mixed with the fracturing fluid being pumped whereby the pre-coated proppant particles are suspended therein. When the pre-coated proppant particles reach the fracture(s), the pumping of the fracturing fluid is terminated and the pre-coated proppant particles are deposited therein. Thereafter, the coating composition on the pre-coated proppant particles is allowed to harden by heat and consolidate the proppant particles into one or more permeable packs.

Another improved method of this invention for forming one or more fractures in a subterranean zone penetrated by a well bore and consolidating proppant particles therein comprises the following steps. Proppant particles pre-coated with a hardenable resin coating composition are provided. The coating composition comprises a hardenable organic resin selected from the group consisting of phenolic resin, furan resin, a mixture of phenolic and furan resin, a terpolymer of phenol, the reaction product of furfuryl alcohol with an aldehyde, resoles, a resole/novolak mixture, a bisphenol-aldehyde novolak polymer and a bisphenol homopolymer, a silane coupling agent, and a dimethyl glutarate gel breaker. A gelled liquid fracturing fluid is also prepared or provided and is pumped into the subterranean zone to form one or more fractures. The pre-coated proppant particles are mixed with the fracturing fluid being pumped whereby the pre-coated proppant particles are suspended therein. When the pre-coated proppant particles reach the fracture(s), the pumping of the fracturing fluid is terminated and the pre-coated proppant particles are deposited therein. Thereafter, the coating composition on the pre-coated proppant particles is allowed to harden by heat and consolidate the proppant particles into one or more permeable packs.

Pre-coated proppant particles of this invention comprise proppant particles and a coating composition comprising a hardenable organic resin, a silane coupling agent and a gel breaker. The improved coating composition of this invention for pre-coating proppant particles comprises a hardenable organic resin, a silane coupling agent and a gel breaker.

The objects, features and advantages of the present invention will be readily apparent to those skilled in the art upon a reading of the description of preferred embodiments which follows.

DESCRIPTION OF THE PREFERRED EMBODIMENTS

The present invention provides improved methods and compositions for forming one or more fractures in a subterranean zone and consolidating proppant particles therein. A preferred method of the present invention of forming one or more fractures in a subterranean zone and consolidating proppant particles pre-coated with a hardenable coating therein comprises the following steps. Proppant particles pre-coated with a hardenable resin coating composition are provided. The coating composition comprises a hardenable organic resin, a silane coupling agent and a gel breaker. A gelled liquid fracturing fluid is also prepared or provided and is pumped into the subterranean zone to form one or more fractures therein. The pre-coated proppant particles are mixed with the fracturing fluid being pumped whereby the pre-coated proppant particles are suspended therein. When the pre-coated proppant particles reach the fracture(s), the pumping of the fracturing fluid is terminated and the pre-coated proppant particles are deposited therein. Thereafter, the coating composition on the pre-coated proppant particles is allowed to harden by heat and consolidate the proppant particles into one or more permeable packs.

The proppant particles utilized in accordance with the present invention are generally of a size such that formation particulate solids that migrate with produced fluids are prevented from being produced from the subterranean zone. Various kinds of proppant particles can be utilized including graded sand, bauxite, ceramic materials, glass materials, walnut hulls, polymer beads and the like. Generally, the proppant particles have a size in the range of from about 2 to about 400 mesh, U.S. Sieve Series. The preferred proppant is graded sand having a particle size in the range of from about 10 to about 70 mesh, U.S. Sieve Series. Preferred sand particle size distribution ranges are one or more of 10–20 mesh, 20–40 mesh, 40–60 mesh or 50–70 mesh, depending on the particular size and distribution of formation solids to be screened out by the consolidated proppant particles.

Hardenable resins suitable for use in the present invention include, but are not limited to, phenolic resin, furan resin, a mixture of phenolic and furan resin, a terpolymer of phenol, the reaction product of furfuryl alcohol with an aldehyde, resoles, resole/novolak mixtures, a bisphenol-aldehyde novolak polymer, and a bisphenol homopolymer. Preferably the hardenable resin is a phenolic or furan resin and more preferably the hardenable resin is a mixture of phenolic and furan resin. A suitable phenolic and furan resin mixture is available commercially from the Durez Corporation of Grand Island, N.Y.

The hardenable resin is the main constituent of the hardenable resin composition and is generally present in an amount in the range of from about 40% to about 70% by weight of the coating composition, and more preferably in an amount of from about 50% to about 60%.

Silane coupling agents are used to ensure good bonding between the hardenable organic resin and the proppant particle. Examples of silane coupling agents which can be utilized in the hardenable resin composition include, but are not limited to, N-2-(aminoethyl)-3-aminopropyltrimethoxysilane, 3-glycidoxypropyltrimethoxysilane and n-beta-(aminoethyl)-gamma-aminopropyltrimethoxysilane. Of these, n-beta-(aminoethyl)-gamma-aminopropyltrimethoxysilane is preferred. The silane coupling agent is included in the coating composition in an amount in the range of from about 0.1% to about 3% by weight of the composition and more preferably in an amount of from about 0.5% to about 2%.

Gel breakers are included in the coating composition to facilitate removal of the film of gelled carrier fluid that forms on the surface of the resin coated proppant particles. The gel breaker, and inclusion of the gel breaker in the coating composition, reduces the viscosity of the gel film separating adjacent resin coated proppant particles and allows the resin coated proppant particles to contact each other before the resin coating completely cures. The gel breaker component utilized in the encapsulated gel breaker can be, but is not limited to, oxidative breakers, delayed release acids, delayed release enzymes, temperature activated breakers, and hydrolyzable esters.

Examples of oxidative breakers suitable for use in the coating composition of this invention include, but are not limited to, organic peroxides, alkali metal persulfates, and alkali metal chlorites, bromates, chlorates, hypochlorites and permanganates.

Examples of delayed release acid breakers suitable for use in the coating composition of this invention include, but are not limited to, acetic anhydride and organic and inorganic acids such as fumaric acid, benzoic acid, sulfonic acid, phosphoric acids, aliphatic polyesters, poly lactic acid, poly (lactides), polyanhydrides, and poly(amino acids).

Delayed release enzyme breakers may be used to catalyze the hydrolysis of glycosidic bonds between the monomer units of polysaccharides in the gel, thus reducing the gel viscosity. Examples of suitable delayed release enzyme breakers suitable for use in the coating composition include, but are not limited to, alpha and beta amylases, exo- and endo-glucosidases, amyloglucosidase, oligoglucosidase, invertase, maltase, cellulase, hemicellulase, endo-xylanase and exo-xylanase. More preferred enzyme breakers are enzymes or combinations of enzymes that attack the glucosidic linkages of the cellulose polymer backbone and degrade the polymer into mostly monosaccharide and disaccharide units. Examples of such enzyme breakers include, but are not limited to, cellulase, hemicellulase, endo-glucosidase, exo-glucosidase, exo-xylanase and the like. The two most preferred enzyme breakers are exo- and endo-glucosidases.

Temperature activated breakers activate when the pre-coated proppant particles are heated by the subterranean zone in which they are placed, to the activation temperature of the breaker. Examples of suitable temperature activated breakers for use in the coating composition include, but are not limited to, alkaline earth metal peroxides such as calcium peroxide and magnesium peroxide, zinc peroxide and mixtures thereof.

Preferably, the present invention utilizes gel breakers that can complex with the gel crosslinking agent in the polymer gel. Examples of such gel breakers include, but are not limited to, hydrolyzable esters such as sorbitol, catechol, dimethyl glutarate and mixtures of dimethyl glutarate, dimethyl succinate and dimethyl adipate. More preferably the gel breaker is dimethyl glutarate.

The gel breaker utilized in the present invention is optionally encapsulated with a water soluble material or other encapsulating material using procedures known to those skilled in the art. The encapsulating material slowly releases the gel breaker. Examples of encapsulating materials that can be used include, but are not limited to, polyvinyl alcohol, polylactic acid, EPDM rubber, polyvinylidene chloride, nylon, waxes, polyurethanes, cross-linked partially hydrolyzed acrylics and surfactants.

Preferably, the gel breaker is present in the coating composition in an amount in the range of from about 0.1% to about 10% by weight thereof, and more preferably from about 1% to about 4%. The gel breaker may be added to the coating composition prior to coating the proppant particles, resulting in fairly uniform distribution of gel breaker in the coating composition. The gel breaker may also be added to the mixer just after the proppant particles have been coated and while the resin is still partially curing. In this case the gel breaker is distributed closer to the outer surface of the coating. Alternatively, the gel breaker may be coated onto proppant particles pre-coated with resin that has already partially cured. The gel breaker may be also coated onto resin pre-coated proppant on the fly at the well site as the pre-coated proppant is being pumped down hole during the hydraulic fracturing treatment. These last two methods result in the gel breaker being present mostly as an outer layer of the coating composition.

A number of other components may be added to the coating composition. For example, a catalyst can be added to the resin to reduce the time and temperature needed to partially cure the resin in the coating and produce individual, free flowing resin pre-coated proppant particles. Suitable catalysts generally include water soluble multivalent metal ion salts such as nitrates and chlorides, acids with a pKa of about 4.0 or lower, ammonia, and amine salts of acids with a pKa of about 4.0 or lower. Examples of suitable acids with a pKa of about 4.0 or lower include, but are not limited to, phosphoric, sulfuric, nitric, benzenesulfonic, toluenesulfonic, xylenesulfonic, sulfamic, oxalic and salicylic acids. Examples of suitable amine salts of acids with a pKa of about 4.0 or lower include, but are not limited to, amine nitrates such as ammonium nitrate, amine chlorides, amine sulfates and amine fluorides.

The coating composition is preferably pre-coated on the proppant particles in an amount ranging from about 0.1% to about 5% by weight of the proppant particles and more preferably from about 2% to about 4%.

A gelled liquid fracturing fluid is prepared or provided. The gelled liquid fracturing fluid is comprised of water and a gelling agent. Suitable gelling agents include, but are not limited to, guar gum, guar gum derivatives and cellulose derivatives. The gelling agent in the fracturing fluid is generally present in an amount in the range of from about 0.01% to about 4% by weight of water therein and more preferably in an amount of about 0.1% to about 2%. The gelled liquid fracturing fluid can include a cross-linking agent for increasing the viscosity of the fracturing fluid. Examples of suitable cross-linking agents include, but are not limited to, alkali metal borates, borax, boric acid and compounds capable of releasing multivalent metal ions in aqueous solutions. When used, the cross-linking agent is included in the fracturing fluid in an amount in the range of from about 0.01% to about 3% by weight of water therein and more preferably in an amount of about 0.1% to about 2%.

The fracturing fluid generally also includes a delayed viscosity breaker which functions to reduce the viscosity of the fracturing fluid and cause the resin composition coated proppant particles suspended in the fracturing fluid to be deposited in the fractures. Delayed viscosity breakers which can be utilized include, but are not limited to, oxidizers and enzymes. When used, the delayed viscosity breaker is included in the fracturing fluid in an amount in the range of from about 0.01% to about 5% by weight of water therein.

A particularly suitable embodiment of this invention for forming one or more fractures in a subterranean zone penetrated by a well bore and consolidating pre-coated proppant particles therein comprises the following steps. Proppant particles pre-coated with a hardenable resin coating composition are prepared or provided. The coating composition comprises a hardenable organic resin selected from the group consisting of a mixture of phenolic and furan resin, a terpolymer of phenol, furfuryl alcohol and an aldehyde, resoles, resole/novolak mixtures, a bisphenol-aldehyde novolak polymer, and a bisphenol homopolymer, a silane coupling agent and an gel breaker comprising a mixture of hydrolyzable esters. A gelled liquid fracturing fluid is also prepared or provided and is pumped into the subterranean zone to form one or more fractures therein. The pre-coated proppant particles are mixed with the fracturing fluid being pumped whereby the pre-coated proppant particles are suspended therein. When the pre-coated proppant particles reach the fracture(s), the pumping of the fracturing fluid is terminated and the pre-coated proppant particles are deposited therein. Thereafter, the coating composition on the pre-coated proppant particles is allowed to harden by heat and consolidate the proppant particles into one or more chemical and thermal degradation resistant permeable packs.

Preferred pre-coated proppant particles of this invention comprise proppant particles coated with a coating composition comprising a hardenable organic resin, a silane coupling agent and a gel breaker. The pre-coated proppant particles are described above in the discussion of methods of this invention.

Preferred coating compositions of this invention comprise a hardenable organic resin, a silane coupling agent and a gel breaker. Preferred compositions are described above in the discussion of methods of this invention.

A preferred method of forming one or more fractures in a subterranean zone penetrated by a well bore and consolidating proppant particles therein comprises the steps of: (a) providing proppant particles pre-coated with a coating composition comprising a hardenable organic resin, a silane coupling agent and a gel breaker; (b) preparing or providing a gelled liquid fracturing fluid; (c) pumping the gelled liquid fracturing fluid into the subterranean zone to form one or more fractures; (d) mixing the proppant particles pre-coated with the coating composition with the fracturing fluid pumped in accordance with step (c) whereby the pre-coated proppant particles are suspended therein; (e) when the pre-coated proppant particles reach the one or more fractures, terminating the pumping of the fracturing fluid; and (f) allowing the coating composition on the pre-coated proppant particles to harden by heat and consolidate the proppant particles into one or more permeable packs.

Thus, the present invention is well adapted to attain the objects and advantages mentioned as well as those that are inherent within. While numerous changes may be made by those skilled in the art, such changes are encompassed within the spirit of this invention as defined by the appended claims.

What is claimed is:

1. A method of forming one or more fractures in a subterranean zone penetrated by a well bore and consolidating proppant particles therein comprising the steps of:

(a) providing proppant particles pre-coated with a coating composition comprising a hardenable organic resin, a silane coupling agent and a gel breaker;

(b) preparing or providing a gelled liquid fracturing fluid;
(c) pumping the gelled liquid fracturing fluid into the subterranean zone to form the one or more fractures therein;
(d) mixing the proppant particles pre-coated with the coating composition with the fracturing fluid pumped in accordance with step (c) whereby the pre-coated proppant particles are suspended therein;
(e) when the pre-coated proppant particles reach the one or more fractures, terminating the pumping of the fracturing fluid; and
(f) allowing the coating composition on the pre-coated proppant particles to harden by heat and consolidate the proppant particles into one or more permeable packs.

2. The method of claim 1 wherein the hardenable organic resin is selected from the group consisting of phenolic resins, furan resins, mixtures of phenolic and furan resins, terpolymers of phenol, reaction products of furfuryl alcohol with an aldehyde, resoles, resole/novolak mixtures, bisphenol-aldehyde novolak polymers, and bisphenol homopolymers.

3. The method of claim 1 wherein the hardenable organic resin is a mixture of phenolic resin and furan resin.

4. The method of claim 1 wherein the hardenable organic resin is present in the coating composition in an amount in the range of from about 40% to about 70% by weight thereof.

5. The method of claim 1 wherein the silane coupling agent is selected from the group consisting of N-2-(aminoethyl)-3-aminopropyltrimethoxysilane, 3-glycidoxypropyltrimethoxysilane and n-beta-(aminoethyl)-gamma-aminopropyltrimethoxysilane.

6. The method of claim 1 wherein the silane coupling agent is present in the hardenable resin composition in an amount in the range of from about 0.1% to about 3% by weight thereof.

7. The method of claim 1 wherein the gel breaker is selected from the group consisting of oxidative breakers, delayed release acids, delayed release enzymes, temperature activated breakers and hydrolyzable esters.

8. The method of claim 1 wherein the gel breaker is an oxidative breaker selected from the group consisting of organic peroxides, alkali metal persulfates and alkali metal chlorites, bromates, chlorates, hypochlorites and permanganates.

9. The method of claim 1 wherein the gel breaker is a delayed release acid breaker selected from the group consisting of acetic anhydride, fumic acid, benzoic acid, sulfonic acid, phosphoric acid, aliphatic polyesters, polylactic acid, polylactides, polyanhydrides, and polyamino acids.

10. The method of claim 1 wherein the gel breaker is a delayed release enzyme selected from the group consisting of alpha and beta amylases, exo- and endo-glucosidases, amyloglucosidase, oligoglucosidase, invertase, maltase, cellulase, hemicellulase, endo-xylanase and exo-xylanase.

11. The method of claim 1 wherein the gel breaker is a temperature activated breaker selected from the group consisting of alkaline earth metal peroxides, zinc peroxides and mixtures thereof.

12. The method of claim 1 wherein the gel breaker is a hydrolyzable ester selected from the group consisting of sorbitol, catechol, dimethyl glutarate and mixtures of dimethyl glutarate, dimethyl succinate and dimethyl adipate.

13. The method of claim 1 wherein the gel breaker is dimethyl glutarate.

14. The method of claim 1 wherein the gel breaker is encapsulated in a water soluble encapsulating material.

15. The method of claim 1 wherein the gel breaker is encapsulated in an encapsulating material selected from the group consisting of polyvinyl alcohol, polylactic acid, EPDM rubber, polyvinylidene chloride, nylon, waxes, polyurethanes, cross-linked partially hydrolyzed acrylics and surfactants.

16. The method of claim 1 wherein the gel breaker is present in the coating composition in an amount in the range of from about 0.1% to about 10% by weight thereof.

17. The method of claim 1 wherein the gel breaker is added to the coating composition prior to coating the proppant particles.

18. The method of claim 1 wherein the gel breaker is added to the coating composition just after the particles have been coated with the hardenable organic resin and while the resin is still partially curing.

19. The method of claim 1 wherein the gel breaker is added to the coating composition as an outer layer after the particles have been coated with the hardenable organic resin and the resin has partially cured.

20. The method of claim 1 wherein the gel breaker is added to the coating composition as an outer layer at the well site.

21. The method of claim 1 wherein the coating composition is pre-coated on the proppant particles in an amount ranging from about 0.1% to about 5% by weight of the proppant particles.

22. A method of forming one or more fractures in a subterranean zone penetrated by a well bore and consolidating proppant particles therein comprising the steps of:
(a) providing proppant particles pre-coated with a coating composition comprising
a hardenable organic resin selected from the group consisting of phenolic resins, furan resins, mixtures of phenolic and furan resins, terpolymers of phenol, reaction products of furfuryl alcohol with an aldehyde, resoles, resole/novolak mixtures, bisphenol-aldehyde novolak polymers, and bisphenol homopolymers,
a silane coupling agent, and
a gel breaker comprising dimethyl glutarate;
(b) preparing or providing a gelled liquid fracturing fluid;
(c) pumping the gelled liquid fracturing fluid into the subterranean zone to form the one or more fractures therein;
(d) mixing the proppant particles pre-coated with the coating composition with the fracturing fluid pumped in accordance with step (c) whereby the pre-coated proppant particles are suspended therein;
(e) when the pre-coated proppant particles reach the one or more fractures, terminating the pumping of the fracturing fluid; and
(f) allowing the coating composition on the pre-coated proppant particles to harden by heat and consolidate the proppant particles into one or more chemical and thermal degradation resistant permeable packs.

* * * * *